US009587157B2

(12) United States Patent
Chen et al.

(10) Patent No.: US 9,587,157 B2
(45) Date of Patent: Mar. 7, 2017

(54) SULFIDE STRESS CRACKING INHIBITORS

(71) Applicant: Halliburton Energy Services, Inc., Houston, TX (US)

(72) Inventors: Gong Chen, Houston, TX (US); Juanita Cassidy, Duncan, OK (US); Jim L. Lane, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/777,580

(22) PCT Filed: Jul. 30, 2014

(86) PCT No.: PCT/US2014/048912
§ 371 (c)(1),
(2) Date: Sep. 16, 2015

(87) PCT Pub. No.: WO2016/018311
PCT Pub. Date: Feb. 4, 2016

(65) Prior Publication Data
US 2016/0272867 A1     Sep. 22, 2016

(51) Int. Cl.
| | | |
|---|---|---|
| *C09K 8/584* | (2006.01) |
| *C09K 8/52* | (2006.01) |
| *C09K 8/28* | (2006.01) |
| *C09K 8/02* | (2006.01) |
| *C09K 8/00* | (2006.01) |
| *C09K 8/035* | (2006.01) |
| *C09K 8/54* | (2006.01) |
| *C09K 8/74* | (2006.01) |
| *E21B 17/00* | (2006.01) |
| *E21B 41/00* | (2006.01) |
| *E21B 21/06* | (2006.01) |

(52) U.S. Cl.
CPC ............... *C09K 8/00* (2013.01); *C09K 8/035* (2013.01); *C09K 8/54* (2013.01); *C09K 8/74* (2013.01); *E21B 17/00* (2013.01); *E21B 41/00* (2013.01); *C09K 2208/22* (2013.01); *C09K 2208/32* (2013.01); *E21B 21/062* (2013.01)

(58) Field of Classification Search
CPC .. C09K 8/52; C09K 8/532; C09K 8/54; Y10S 507/932; Y10S 507/939
USPC ........................................................ 507/252
See application file for complete search history.

(56) References Cited

U.S. PATENT DOCUMENTS

| | | |
|---|---|---|
| 3,669,613 A | 6/1972 | Knox et al. |
| 4,696,763 A | 9/1987 | Bentley et al. |
| 7,994,099 B2 | 8/2011 | Cassidy et al. |

(Continued)

FOREIGN PATENT DOCUMENTS

WO    WO-2016018311 A1    2/2016

OTHER PUBLICATIONS

"International Application Serial No. PCT/US2014/048912, International Search Report mailed Apr. 29, 2015", 3 pgs.

(Continued)

*Primary Examiner* — Aiqun Li
(74) *Attorney, Agent, or Firm* — Chamberlain Hrdlicka

(57) ABSTRACT

The invention provides a method, composition, and system for inhibiting sulfide stress cracking of metal that is exposed to aqueous sulfide and aqueous acid, and optionally brine, where the composition comprises a thietane compound, a thiirane compound, or a combination thereof.

18 Claims, 2 Drawing Sheets

(56) References Cited

U.S. PATENT DOCUMENTS

2003/0060372 A1* 3/2003 Fan .......................... C02F 1/50
  507/117
2011/0152137 A1   6/2011 Taylor
2013/0186300 A1   7/2013 Roschmann et al.

OTHER PUBLICATIONS

"International Application Serial No. PCT/US2014/048912, Written Opinion mailed Apr. 29, 2015", 5 pgs.
Adams, Richard D., et al., "The Catalytic Synthesis of Thiacrowns from Thietanes and Thiiranes by Metal Carbonyl Complexes", Aldrichimica Acta, 33(2), (Jan. 2000), 39-48.

* cited by examiner

SULFIDE STRESS CRACKING INHIBITORS

PRIORITY APPLICATIONS

This application is a U.S. National Stage Filing under 35 U.S.C. 371 from International Application No. PCT/US2014/048912, filed on 30 Jul. 2014; which application is incorporated herein by reference in its entirety.

BACKGROUND OF THE INVENTION

Sulfide stress cracking is a form of metal failure which is different from, and not necessarily related to normal corrosion, and which may occur even in the absence of substantial oxidation, hydrogen generation, or metal removal. Sulfide stress cracking normally occurs in metals under an applied or a residual stress resulting, for instance, from cold working. Sulfide stress cracking moreover can occur even though a metal is inhibited against normal corrosion. Thus, typical corrosion inhibitors are relatively ineffective in the prevention of sulfide stress cracking.

Sulfide stress cracking manifests itself by cracks or fissures that appear on the surface of stressed metal upon its exposure to a hydrogen sulfide-containing environment. After the cracks occur, the metal exhibits greatly reduced strength in the area of the crack and tends to break apart upon continued application of stress. Although sulfide stress cracking is not fully understood, it is thought that free hydrogen atoms enter the stressed metal and lodge between the metals grain boundaries and then combine to form molecular hydrogen, thereby exerting a great force within the surface of the metal. From these considerations flow the conclusions that sulfide stress cracking is a process different from ordinary ferrous metal corrosion: metals that are effectively protected from corrosion by known corrosion inhibitors are still vulnerable to hydrogen sulfide stress cracking, the corrosion inhibitors providing no apparent resistance to the cracking phenomenon.

BRIEF DESCRIPTION OF THE FIGURES

The drawings illustrate generally, by way of example, but not by way of limitation, various embodiments discussed herein.

DETAILED DESCRIPTION OF THE INVENTION

Figure 1:
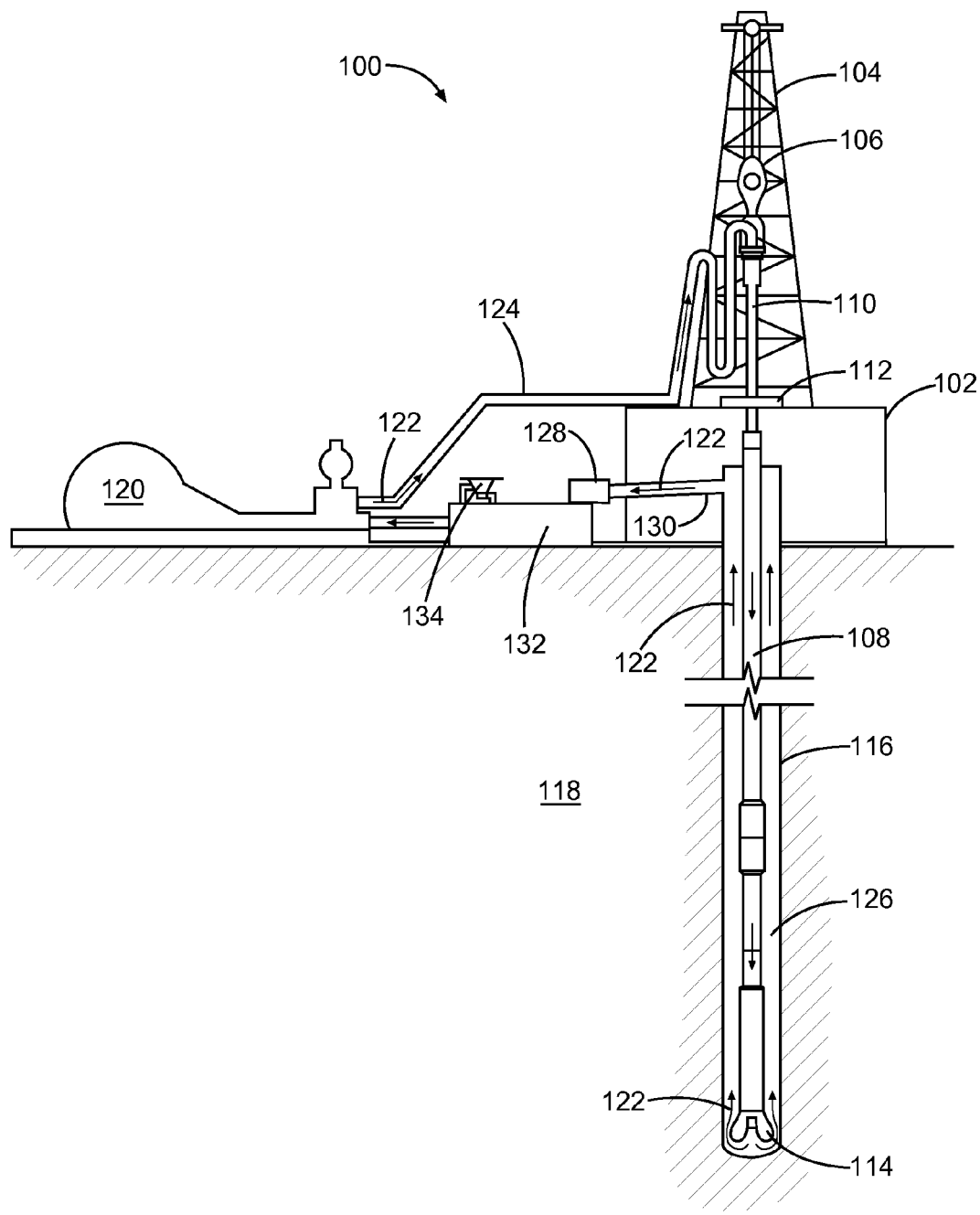
FIG. 1 illustrates a drilling assembly in accordance with various embodiments.

Following is a description of certain embodiments of the disclosed subject matter, examples of which are illustrated in part by the accompanying drawings. While the disclosed subject matter is described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material is any below-ground area that can produce liquid or gaseous petroleum materials, water, or any section below-ground in fluid contact therewith.

Embodiments of the present invention relate to compositions for use in subterranean formations. More specifically, embodiments of the present invention relate to compositions comprising, among other things, thietane and/or thiirane compounds of formulae I and II, respectively, that in the presence of an aqueous acid inhibit the sulfide stress cracking of metal. Some embodiments of the invention also relate to methods of using the treatment fluids in subterranean formations penetrated by wellbores. Hence, the composition of the present invention is suitable for use in, among other applications, acid treatments at ambient temperatures, e.g., 40-100° F. and at elevated temperatures (e.g., temperatures up to 225° F. or higher).

As used herein, the term "drilling fluid" refers to fluids, slurries, or muds used in drilling operations downhole, such as the formation of a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" or "acidic treatment fluids" refers to fluids or slurries used downhole during acidizing treatments downhole. Acidic treatment fluids can be used during or in preparation for any subterranean operation wherein a fluid may be used. Suitable subterranean operations may include, but are not limited to, acidizing treatments (e.g., matrix acidizing or fracture acidizing), wellbore clean-out treatments, and other operations where a treatment fluid of the present invention may be useful. In a matrix acidizing procedure, for example, an aqueous acidic treatment fluid (e.g., a treatment comprising one or more compounds conforming to formulae I and II, an aqueous base fluid, and spent acid) is introduced into a subterranean formation via a wellbore therein under pressure so that the acidic treatment fluid flows into the pore spaces of the formation and reacts with (e.g., dissolves) acid-soluble materials therein. As a result, the pore spaces of that portion of the formation are enlarged, and the permeability of the formation may increase. The flow of hydrocarbons from the formation therefore may be increased because of the increase in formation conductivity caused, among other factors, by dissolution of the formation material.

In fracture acidizing procedures, one or more fractures are produced in the formation(s) and an acidic treatment fluid is introduced into the fracture(s) to etch flow channels therein. Acidic treatment fluids also may be used to clean out wellbores to facilitate the flow of desirable hydrocarbons. Other acidic treatment fluids may be used in diversion processes and wellbore clean-out processes. For example, acidic treatment fluids can be useful in diverting the flow of fluids present within a subterranean formation (e.g., formation fluids and other treatment fluids) to other portions of a formation, for example, by invading higher permeability portions of a formation with a fluid that has high viscosity at low shear rates.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material, such as a polymer, that is in an at least partially uncured state.

As used herein, the term "fluid control material" (e.g., a "water control material") refers to a solid or liquid material that, by virtue of its viscosification in the flowpaths producing a fluid (e.g., water) alters, reduces or blocks the flow rates of such fluids into the wellbore, such that hydrophobic material can more easily travel to the surface and such that hydrophilic material (including water) can less easily travel to the surface. For example, a fluid control material can be used to treat a well to cause a proportion of a fluid produced, which may include water, to decrease and to cause the proportion of hydrocarbons produced to increase, such as by selectively causing the material to form a viscous plug between water-producing subterranean formations and the wellbore, while still allowing hydrocarbon-producing formations to maintain output.

In some embodiments, the fluid control material mitigates (e.g., reduces, stops or diverts) the flow of fluids (e.g., treatment fluids and water) through a portion of a subterranean formation that is penetrated by the well such that the flow of the fluid into high-permeability portions of the formation is mitigated. For example, in an injection well, it may be desirable to seal off high-permeability portions of a subterranean formation that would otherwise accept most of an injected treatment fluid. By sealing off the high-permeability portions of the subterranean formation, the injected treatment fluid may thus penetrate less permeable portions of the subterranean formation. In other embodiments, the fluid control material helps mitigate the production of undesired fluids (e.g., water) from a well by at least sealing off one or more permeable portions of a treated subterranean formation.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

As used herein, the term "hydrocarbyl" refers to a straight chain, branched, or cyclic hydrocarbon. Exemplary hydrocarbyl groups include alkyl, alkenyl, alkynyl, aryl, cycloalkyl, acyl, and any combination thereof.

The term "alkyl" as used herein refers to straight chain and branched alkyl groups and cycloalkyl groups having from 1 to 30 carbon atoms, 10 to 30 carbon atoms, 12 to 18 carbon atoms, 1 to about 20 carbon atoms, 1 to 10 carbons, 1 to 8 carbon atoms 1 to 5 carbon atoms or, in some embodiments, from 1 to 3 carbon atoms. Examples of straight chain alkyl groups include those with from 1 to 8 carbon atoms such as methyl, ethyl, n-propyl, n-butyl, n-pentyl, n-hexyl, n-heptyl, n-octyl groups. Examples of straight chain alkyl groups include those with from 10 to 30 carbon atoms such as n-decyl, n-undecyl, n-dodecyl, n-hexadecyl, n-icosyl, and the like. Examples of branched alkyl groups include, but are not limited to, isopropyl, iso-butyl, sec-butyl, t-butyl, neopentyl, isopentyl, 2,2-dimethylpropyl, and isostearyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH ($CH_3$), —CH=C($CH_3$)$_2$, —C($CH_3$)=$CH_2$, —C($CH_3$)=CH($CH_3$), —C($CH_2CH_3$)=$CH_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C($CH_3$), —C≡C($CH_2CH_3$), —$CH_2$C≡CH, —$CH_2$C≡C($CH_3$), and —$CH_2$C≡C($CH_2CH_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "metal catalyst" as used herein contemplates in some embodiments metal-containing species formed in situ, such as solubilized iron or other metal ions. The term also contemplates in other embodiments metal-containing compounds capable of catalyzing reactions with Formula I or II compounds, such as in the formation of polythioether macrocycles. Exemplary catalysts in this regard are described, for example, by R. D. Adams, *Aldrichchimica Acta* 33(2) (2000) 39-48, which is incorporated by reference in its entirety herein.

In general, the composition of the present invention comprises among other things, a thietane compound of formula I, a thiirane compound of formula II, or a combination thereof, which composition in the presence of or that further comprises an aqueous acid or metal catalyst inhibits sulfide stress cracking of metal. As shown in the appended examples, one advantage of the composition and its method of use is superior inhibition as compared to known sulfide stress cracking inhibitors, e.g., SCA130™, which is a commercially available blend of an aldol condensation product, crotonaldehyde, and acetaldehyde (Halliburton; see U.S. Pat. No. 3,669,613). Another advantage of the composition is the ready availability of formula I and II compounds and their ease of mixture with aqueous acid.

The composition of present invention and its methods of use, according to some embodiments described herein, inhibit sulfide-induced stress cracking of metal that is exposed to environments containing sulfide, such as hydrogen sulfide, e.g., sour-well environments. In some embodiments, the composition when exposed to the metal prolongs metal life prior to cracking, i.e., failure, by a period of at least 2 days, at least 5 days, at least 10 days, at least 15 days, at least 20 days, and at least 25 days, for example, when compared to untreated metal or metal that is treated with conventional anti-cracking compositions in strong acidic environments.

In some embodiments, the composition of the invention comprises a thietane compound conforming to formula (I):

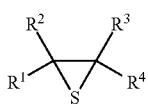

(I)

wherein each of $R^1$-$R^4$ is independently selected from the group consisting of H and an optionally substituted $C_1$-$C_{10}$ hydrocarbyl group, as defined herein. Although all combinations of $R^1$-$R^4$ are contemplated, a typical embodiment provides for formula I compounds wherein each of $R^1$-$R^4$ is hydrogen.

In other embodiments, the composition of the invention comprises a thiirane compound conforming to formula (II):

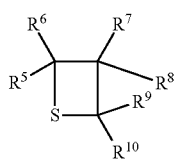

(II)

wherein each of $R^5$-$R^{10}$ is independently selected from the group consisting of H and an optionally substituted $C_1$-$C_{10}$ hydrocarbyl group, as defined hereinabove. Although all combinations of $R^5$-$R^{10}$ are contemplated, a typical embodiment provides for formula II compounds wherein each of $R^5$-$R^{10}$ is hydrogen.

In still another embodiment, the invention provides a composition that comprises, in part, a combination of formula I and formula II compounds. Weight ratios of formula I to formula II compounds can vary, for instance, from about 1:20 to about 20:1, from about 1:15 to about 15:1, from about 1:10 to about 10:1, from about 1:5 to about 5:1, from about 1:2 to about 2:1, and about 1:1. The invention contemplates all weight ratios within these ranges, inclusive of endpoints, even though such ratios are not explicitly enumerated here.

The weight percentage of formula I and/or formula II compounds present in the composition depends on numerous factors, including but not limited to, the elements and their respective amounts constituting the metal that the composition will contact, contact time, temperature, and concentration of sulfide that is in contact with the metal. The weight percentage in various embodiments of the invention thus can range from about 0.01% to about 10%, about 0.05% to about 5%, about 0.08% to about 2%, about 0.09% to about 0.5%. An exemplary weight percentage of formula I and/or formula II compounds is about 0.1%.

In some embodiments, the method of inhibiting sulfide-stress cracking contemplates a metal being exposed to brine. The term "brine" as used herein includes seawater, produced water or flowback water that contains dissolved salts, saltwater (e.g., water containing one or more salts dissolved therein), brackish water, brine (e.g., saturated saltwater), weighted brine (e.g., an aqueous solution of sodium bromide, calcium bromide, zinc bromide and the like), or any combination thereof.

In some embodiments, the composition of the present invention is present as an aqueous composition, or at least a predominant portion of the composition is aqueous, in accordance with the composition further comprising brine as defined hereinabove. Generally, the brine may be from any source, provided that it does not contain components that might adversely affect the stability and/or performance of the sulfide-stress cracking inhibiting effects of the present invention.

In some embodiments, the composition further comprises water-miscible solvents such as alcohols (e.g., isopropanol), alcohol ethers (e.g., ethylene glycol methyl ether, ethyleneglycol butyl ether or combinations thereof) or ketones (e.g., acetone, methyl ethyl ketone or combinations thereof).

In some embodiments, the composition further comprises material suitable for use in a downhole fluid. For example, the composition can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, cross-linking agents, polyacrylamide, a polymer or combination of polymers, antioxidants, heat stabilizers, foam control agents, solvents, diluents, rheology modifier, oil-wetting agents, surfactants, corrosion inhibitors, gases, lost circulation materials, filtration control additives, salts, fibers, thixotropic additives, crosslinkers, rheology modifiers, pH modifiers, chelating agents, scale inhibitors, enzymes, resins, water control materials, markers, hydrate inhibitors, clay stabilizers, bactericides, salt substitutes (such as tetramethyl ammonium chloride), relative permeability modifiers (such as HPT-1™ chemical additive available from Halliburton Energy Services), sulfide scavengers, fibers, nanoparticles, consolidating agents (such as resins and/or tackifiers), surfactants, breakers, fluid loss control additives, asphaltene inhibitors, paraffin inhibitors, salts, bactericides, chelants, foamers, defoamers, emulsifiers, demulsifiers, iron control agents, sulfide cracking agents, particulate diverters, gas phase, carbon dioxide, nitrogen, synthetic polymers, friction reducers or a combination thereof.

In some embodiments, the composition of the present invention comprises particulates, such as proppant particulates (e.g., resin-coated proppant) or gravel particulates. Particulates suitable for use in the present invention comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh or smaller on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. Also, mixtures of particulates may be used having different particle size distribution ranges to enhance the packed volume of the proppant particulates within a fracture. It should be understood that the term "particulate," as used herein, includes all known shapes of materials, including substantially spherical materials, fibrous materials, polygonal materials (such as cubic materials), and mixtures thereof. Moreover, fibrous materials that could be used to bear the pressure of a closed fracture are included in certain embodiments of the present invention. In some embodiments, the particulates are present in the composition of the present invention in an amount in the range of from about 0.5 pounds per gallon ("ppg") to about 30 ppg by volume of the composition. In other embodiments, the proppant is about 1 wt % to about 90 wt % of the composition, e.g., about 5 wt % to about 70 wt % of the composition.

In some embodiments, the composition for use in the method of the present invention further comprises aqueous acid or spent acid, examples of which include hydrochloric acid, hydrofluoric acid, acetic acid, formic acid, citric acid, lactic acid, glycolic acid, sulfamic acid, and the like and combinations thereof.

More generally, according to other embodiments, the aqueous acid is one or more mineral acids, carboxylic acids, hydroxyl carboxylic acids, amino carboxylic acids, and combinations thereof. Exemplary mineral acids include hydrochloric acid and hydrofluoric acid. Illustrative carboxylic acids include acetic acid and formic acid. Examples of hydroxyl carboxylic acids are citric acid, lactic acid, glycolic acid, 3-hydroxypropionic acid, and carbonic acid. Exemplary hydroxyl carboxylic acids are ethylenediamine tetracetic acid glutamic acid diacetic acid, and methylglycine diacetic acid.

The invention contemplates in some embodiments ranges of acid concentrations and combinations of two or more of the acids as described above. For instance, in one embodiment the acid is a mineral acid such as HCl that is present in an amount of about 5% to about 28% (w/w), or from about 5% to about 28%. In other embodiments, the acid is a combination of HCl with formic or acetic acids. In still other embodiments, the acid is a combination of about 6% to about 15% (w/w) HCl and about 0.5% to about 3% (w/w) HF.

In some embodiments, the term "spent acid," as used herein, refers to an acid composition comprising $CaCl_2$ and/or $MgCl_2$ as a result of an acid coming in contact with a carbonate reservoir during a drilling operation.

In some embodiments, the composition of the present invention further comprises one or more gelling agents. Gelling agents include, but are not limited to polyacrylamide, acrylamide/sodium-2-acrylamido-2-methylpropane sulfonate copolymer (PAM/AMPS), alginate, chitosan, curdlan, dextran, emulsan, a galactoglucopolysaccharide, gellan, glucuronan, N-acetyl-heparosan, hyaluronic acid, indicant, kefiran, lentinan, levan, mauran, pullulan, diutan, scleroglucan, schizophyllan, stewartan, succinoglycan, xanthan gum, xylane, welan, starch, tamarind, tragacanth, guar gum, derivatized guar, gum ghatti, gum arabic, locust bean gum, diutan gum, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, carboxymethyl hydroxylpropyl guar or combinations thereof.

When gelling agents are present, the composition can further comprise crosslinking agents. Examples of suitable crosslinking agents include, but are not limited to ferric ions, aluminum ions, borate ions and zirconium ions. These ions may be provided by providing any compound that is capable of producing one or more of these ions. Examples of such compounds include, but are not limited to ferric chloride, aluminum chloride, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like. The crosslinking agent, when present, may be present in the composition in an amount in the range of from about 0.01 percent to about 1.5 percent by weight of the composition, e.g., 0.1 percent to about 0.5 percent by weight, from about 0.15 percent to about 0.35 percent by weight, from about 0.2 percent to about 0.3 percent by weight or from about 0.15 to about 0.3 percent by weight of the composition.

In some embodiments, the composition invention can further comprise breakers capable of reducing the viscosity of the composition at a desired time. Examples of breakers that are suitable for the acidic composition of the present invention include, but are not limited to, sodium chlorite, hypochlorites, perborates, persulfates, peroxides (including organic peroxides), enzymes, derivatives thereof, and combinations thereof. Examples of peroxides that are suitable include tert-butyl hydroperoxide and tert-amyl hydroperoxide. A breaker is included in a composition of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the breaker(s) with a material that will degrade when placed downhole so as to release the breaker at the appropriate time. Coating materials that may be suitable include, but are not limited to, polymeric materials that will degrade when downhole.

Some embodiments provide a composition that further comprises an activator or a retarder to, among other things, optimize the rate at which the composition is "broken" (e.g., the viscosity of the composition is reduced). Any known activator or retarder that is compatible with the composition and the components thereof is suitable for use in the present invention. Examples of activators include, but are not limited to, acid generating materials, chelated iron, copper, cobalt, reducing sugars, derivatives thereof, and combinations thereof. Examples of retarders that may be suitable include sodium thiosulfate and diethylene triamine. In some embodiments, the sodium thiosulfate is used in a range of from about 1 to about 100 lbs per 1000 gallons of acidic composition. An exemplary concentration range is about 5 to about 20 lbs per 1000 gallons. A person of ordinary skill with the benefit of this disclosure is able to identify a suitable activator or retarder and the proper concentration of such activator or retarder for a given application.

One advantage of the composition of the present invention is its stability at temperatures above about 200° F. (e.g., above about 220° F., above about 250° F. or above about 300° F., from about 200° F. to about 300° F., from about 200° F. to about 350° F., from about 200° F. to about 250° F., from about 220° F. to about 350° F., from about 250° F. to about 350° F. or from about 300° F. to about 350° F.).

In other embodiments, the composition of the present invention is used at lower temperature ranges, such as about 40° F. to about 250° F., about 45° to about 100°, and about 50° to about 80°.

The method and composition disclosed herein directly or indirectly affects one or more components or pieces of equipment associated with the preparation, delivery, recapture, recycling, reuse, and/or disposal of the disclosed composition. For example, and with reference to FIG. 1, the composition may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition may be added to, among other things, a drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition is added to, among other things, a drilling fluid 122 at any other location in the drilling assembly 100. In at least one embodiment, for example, there is more than one retention pit 132, such as multiple retention pits 132 in series. Moreover, the retention pit 132 can represent one or more fluid storage facilities and/or units where the composition may be stored, reconditioned, and/or regulated until added to a drilling fluid 122.

As mentioned above, the composition may directly or indirectly affect the components and equipment of the drilling assembly 100. For example, the composition may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition.

The composition may directly or indirectly affect the pump 120, which is intended to represent one or more of any conduits, pipelines, trucks, tubulars, and/or pipes used to fluidically convey the composition downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition can also directly or indirectly affect various downhole equipment and tools that comes into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116. The composition may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the composition may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

In some embodiments, the present invention provides a system. The system is any suitable system that uses or that can be generated by use of the composition described herein, or that can perform or be generated by performance of the method for using the composition described herein. The system comprises a composition as described hereinabove. The system can also include a subterranean formation including the composition therein. In some embodiments, the composition in the system can also include at least one of an aqueous liquid, a downhole fluid, and a proppant.

In some embodiments, the system includes a tubular disposed in a wellbore. The system includes a pump configured to pump the composition downhole through the tubular and into the subterranean formation.

In some embodiments, the system includes a drillstring disposed in a wellbore. The drillstring can include a drill bit at a downhole end of the drillstring. The system can include an annulus between the drillstring and the wellbore. The system can include a pump configured to circulate the composition through the drill string, through the drill bit, and back above-surface through the annulus. The system can further include a fluid processing unit configured to process the composition exiting the annulus to generate a cleaned drilling fluid for recirculation through the wellbore.

In other embodiments, the present invention provides an apparatus. The apparatus can be any suitable apparatus that can use or that can be generated by use of the composition described herein in a subterranean formation, or that can perform or be generated by performance of a method for using the method for using the composition described herein.

Some embodiments provide systems and apparatus configured for delivering the composition described herein to a downhole location and for using the composition therein. In various embodiments, the systems can include a pump fluidly coupled to a tubular (e.g., any suitable type of oilfield pipe, such as pipeline, drill pipe, production tubing, and the like), the tubular containing a composition described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump is a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 2:
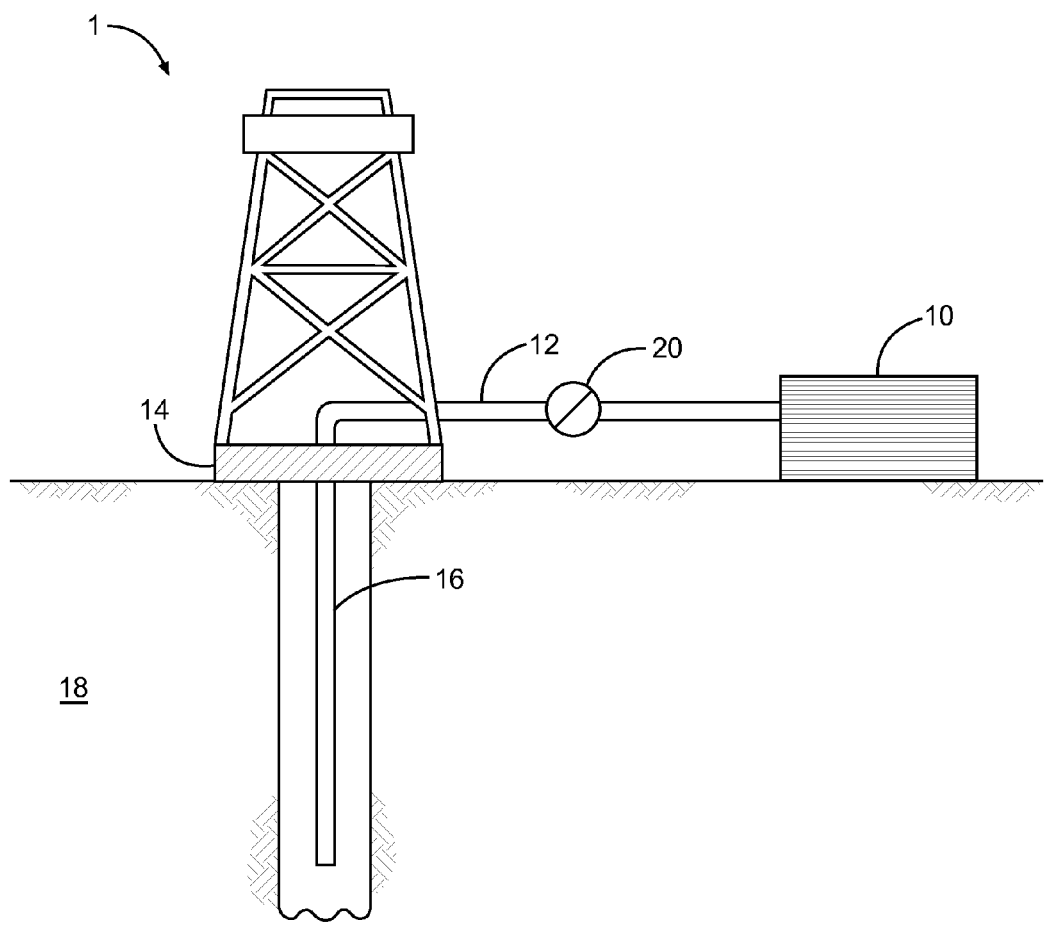
FIG. 2 illustrates a system for delivering a composition to a subterranean formation in accordance with various embodiments.

FIG. 2 shows an illustrative schematic of systems and apparatuses that can deliver compositions of the present invention to a downhole location, according to one or more embodiments. While FIG. 2 generally depicts a land-based system or apparatus, similar systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

The composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, although the present invention is specifically disclosed by exemplary embodiments and optional features, modification and variation of the concepts herein disclosed can be implemented by those of ordinary skill in the art, and such modifications and variations are considered to be within the scope of this invention as defined by the appended claims.

EXAMPLES

The following examples illustrate specific embodiments of the invention. Accordingly, the invention is not limited to the examples given herein.

Example 1

The purpose of this example is to compare the inhibiting ability of sulfide stress cracking for an industry standard cracking inhibitor most commonly used in acid environments, SCA-130™, to that of ethylene sulfide, an exemplary formula I compound, in acidic brine and strong acid solutions. SCA-130™ as described above is a commercially available product (Halliburton) that is widely used for anti-sulfide stress cracking in oilfield stimulation fluids.

First, metal C-rings were made of low alloy carbon steel with OD of 2.00 inch, wall thickness of 0.175 inch and width of 0.625 inch. The C-rings were heat treated to Rockwell (C) hardness HRC of 35±1. The C-rings were stressed to 100% yield stress during the testing period.

Second, C-rings as prepared above were independently exposed to volumes of two solutions saturated with $H_2S$. The first solution was acidic brine, which was composed of aqueous 5% NaCl and 1% acetic acid (pH 2.6). The second solution was aqueous 15% HCl. Exposures of the C-rings to both solutions were carried out at a constant 23° C. over the duration of the tests.

Experiments were performed in three volumes of each solution. A first volume contained no additive, thereby constituting a control experiment. A second volume contained 0.1% SCA-130. The third volume contained 0.1% ethylene sulfide.

Inhibition of sulfide stress cracking of the C-rings was determined by the time to failure, e.g., cracking, of the C-rings while exposed to their respective solutions. Tables 1 and 2 below tabulate the results of the tests for the six different solutions.

TABLE 1

C-ring Sulfide Stress Cracking Test (5% NaCl/1% acetic acid (aq))

| Solution | Additive | Time to Failure |
|---|---|---|
| 1 | none (control) | 5 hours |
| 2 | 0.1 wt % SCA-130 | 4 days |
| 3 | 0.1 wt % ethylene sulfide | >18 days, no cracking detected |

TABLE 2

C-ring Sulfide Stress Cracking Test (15% HCl (aq))

| Solution | Additive | Time to Failure |
|---|---|---|
| 1 | none (control) | 4 hours |
| 2 | 0.1 wt % SCA-130 | 20 hours |
| 3 | 0.1 wt % ethylene sulfide | 5 days |

Data from each set of experiments demonstrate a surprising and superior inhibition of sulfide-stress cracking for an exemplary composition and method of the present invention, compared to an industry standard anti-stress cracking inhibitor. The tests moreover emphasize such superiority because the data is based upon equal weight percentages of SCA-130 and ethylene sulfide in their respective solutions.

The invention contemplates numerous embodiments, including those described hereinabove and those below. The numbering of the following embodiments is not to be construed as designating levels of importance.

Embodiment 1 is a method of inhibiting sulfide stress cracking of metal in a subterranean formation, the method comprising contacting the metal with a composition comprising a thietane of formula I:

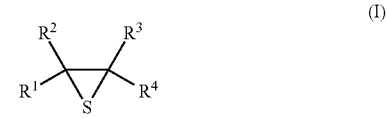

a thiirane of formula II:

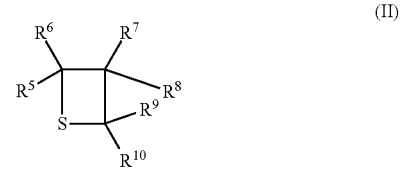

or a combination thereof, wherein
each of $R^1$-$R^{10}$ is independently selected from the group consisting of H and an optionally substituted $C_1$-$C_{10}$ hydrocarbyl group; and
the metal is exposed to aqueous sulfide and aqueous acid.

Embodiment 2 relates to embodiment 1, wherein the sulfide is present as hydrogen sulfide.

Embodiment 3 relates to embodiment 2, wherein the composition comprises a thiirane of formula I, wherein each of $R^1$-$R^4$ is H.

Embodiment 4 relates to embodiment 1, wherein the composition comprises the aqueous acid.

Embodiment 5 relates to embodiment 1, wherein the metal is additionally exposed to aqueous brine.

Embodiment 6 relates to embodiment 1, wherein the contacting occurs before the metal is exposed to aqueous sulfide and aqueous acid.

Embodiment 7 relates to embodiment 1, wherein the contacting occurs at least partially simultaneously with the exposure of the metal to aqueous acid.

Embodiment 8 relates to embodiment 7, wherein the contacting occurs before the metal is exposed to aqueous sulfide.

Embodiment 9 relates to embodiment 1, wherein the metal is exposed to aqueous sulfide and aqueous acid in a subterranean formation.

Embodiment 10 relates to embodiment 1, wherein the aqueous acid is selected from the group consisting of mineral acids, carboxylic acids, hydroxyl carboxylic acids, amino carboxylic acids, and combinations thereof.

Embodiment 11 relates to embodiment 10, wherein the acid is a mineral acid is selected from the group consisting of hydrochloric acid, hydrofluoric acid, and combinations thereof.

Embodiment 12 relates to embodiment 10, wherein the acid is a carboxylic acid selected from the group consisting of acetic acid, formic acid, and combinations thereof.

Embodiment 13 relates to embodiment 10, wherein the acid is a hydroxyl carboxylic acid selected from the group consisting of citric acid, lactic acid, glycolic acid, 3-hydroxypropionic acid, carbonic acid, and combinations thereof.

Embodiment 14 relates to embodiment 10, wherein the acid is a hydroxyl carboxylic acid selected from the group consisting of ethylenediamine tetracetic acid, glutamic acid diacetic acid, methylglycine diacetic acid, and combinations thereof.

Embodiment 15 relates to embodiment 1, wherein the aqueous acid is present in an amount of about 1% to about 40% (w/w).

Embodiment 16 relates to embodiment 15, wherein the aqueous acid is present in an amount of about 5% to about 20% (w/w).

Embodiment 17 relates to embodiment 16, wherein the aqueous acid is present in an amount of about 15% (w/w).

Embodiment 18 relates to embodiment 1, wherein the sulfide is present as hydrogen sulfide downhole in an oilfield;
  the composition comprises a thiirane of formula I, wherein each of $R^1$-$R^4$ is H;
  the composition comprises the aqueous acid; and
  the contacting occurs simultaneously with the exposure of the metal to aqueous acid, and before the metal is exposed to aqueous sulfide.

Embodiment 19 of the invention is a system configured to perform the method of embodiment 1, wherein the system comprises:
  the composition; and
  a drillstring disposed in a wellbore, the drillstring comprising a drill bit at a subterranean end of the drillstring.

Embodiment 20 relates to embodiment 19, wherein the system further comprises an annulus between the drillstring and the wellbore; and the system further comprises a pump configured to circulate the composition through the drill string.

Embodiment 21 relates to embodiment 20, wherein the system further comprises a fluid processing unit configured to process the composition exiting the annulus to generate a cleaned composition for recirculation through the wellbore.

Embodiment 22 relates to embodiment 1, wherein the system comprises:
  the composition;
  a tubular disposed in a wellbore; and
  a pump configured to pump the composition into the subterranean formation.

Embodiment 23 is a composition comprising:
  (A) the product of a reaction between (1) an aqueous acid and/or metal catalyst and (2) a thietane of formula I:

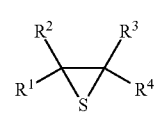

a thiirane of formula II,

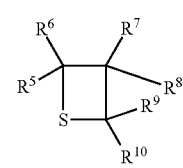

or a combination thereof, wherein
  each of $R^1$-$R^{10}$ is independently selected from the group consisting of H and an optionally substituted $C_1$-$C_{10}$ hydrocarbyl group; and
(B) a downhole fluid.

Embodiment 24 is a composition comprising:
(A) a thietane of formula I:

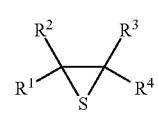

a thiirane of formula II,

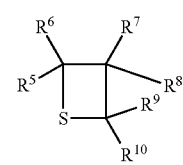

or a combination thereof, wherein
  each of $R^1$-$R^{10}$ is independently selected from the group consisting of H and an optionally substituted $C_1$-$C_{10}$ hydrocarbyl group; and
(B) a downhole fluid.

Embodiment 25 relates to embodiment 23 or 24, wherein the downhole fluid is brine.

Embodiment 26 relates to embodiment 23, wherein the reaction is between the aqueous acid and a thietane of formula I, wherein each of $R^1$-$R^4$ is hydrogen.

Embodiment 27 relates to embodiment 26, wherein the aqueous acid is selected from the group consisting of mineral acids, carboxylic acids, hydroxyl carboxylic acids, amino carboxylic acids, and combinations thereof.

Embodiment 28 relates to embodiment 27, wherein the acid is a mineral acid is selected from the group consisting of hydrochloric acid, hydrofluoric acid, and combinations thereof.

Embodiment 29 relates to embodiment 27, wherein the acid is a carboxylic acid selected from the group consisting of acetic acid, formic acid, and combinations thereof.

Embodiment 30 relates to embodiment 27, wherein the acid is a hydroxyl carboxylic acid selected from the group consisting of citric acid, lactic acid, glycolic acid, 3-hydroxypropionic acid, carbonic acid, and combinations thereof.

Embodiment 31 relates to embodiment 27, wherein the acid is a hydroxyl carboxylic acid selected from the group consisting of ethylenediamine tetracetic acid, glutamic acid diacetic acid, methylglycine diacetic acid, and combinations thereof.

Embodiment 32 relates to embodiment 23, wherein the aqueous acid is present in an amount of about 1% to about 40% (w/w).

Embodiment 33 relates to embodiment 32, wherein the aqueous acid is present in an amount of about 5% to about 20% (w/w).

Embodiment 34 relates to embodiment 33, wherein the aqueous acid is present in an amount of about 15% (w/w).

Embodiment 35 relates to embodiment 23, wherein
the reaction is between the aqueous acid and a thietane of formula I, wherein each of $R^1$-$R^4$ is hydrogen; and
the aqueous acid is 15% (w/w) hydrochloric acid.

We claim:

1. A method of inhibiting sulfide stress cracking of metal in a subterranean formation, the method comprising contacting a metal with a composition comprising a compound of formula I:

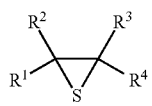

a compound of formula II:

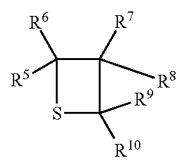

or a combination thereof, wherein
each of $R^1$-$R^{10}$ is independently selected from the group consisting of H and an optionally substituted $C_1$-$C_{10}$ hydrocarbyl group; and
the metal is exposed to an aqueous sulfide and an aqueous acid.

2. The method according to claim 1, wherein the sulfide is present as hydrogen sulfide.

3. The method according to claim 2, wherein the composition comprises a thiirane of formula I, wherein each of $R^1$-$R^4$ is H.

4. The method according to claim 1, wherein the composition comprises the aqueous acid.

5. The method according to claim 1, wherein the metal is additionally exposed to an aqueous brine.

6. The method according to claim 1, wherein the contacting occurs before the metal is exposed to the aqueous sulfide and the aqueous acid.

7. The method according to claim 1, wherein the contacting occurs at least partially simultaneously with the exposure of the metal to the aqueous acid.

8. The method according to claim 7, wherein the contacting occurs before the metal is exposed to the aqueous sulfide.

9. The method according to claim 1, wherein the metal is exposed to the aqueous sulfide and the aqueous acid in a subterranean formation.

10. The method according to claim 1, wherein the aqueous acid is selected from the group consisting of mineral acids, carboxylic acids, hydroxyl carboxylic acids, amino carboxylic acids, and combinations thereof.

11. The method according to claim 10, wherein the acid is a mineral acid is selected from the group consisting of hydrochloric acid, hydrofluoric acid, and combinations thereof.

12. The method according to claim 10, wherein the acid is a carboxylic acid selected from the group consisting of acetic acid, formic acid, and combinations thereof.

13. The method according to claim 10, wherein the acid is a hydroxyl carboxylic acid selected from the group consisting of citric acid, lactic acid, glycolic acid, 3-hydroxypropionic acid, carbonic acid, and combinations thereof.

14. The method according to claim 10, wherein the acid is a hydroxyl carboxylic acid selected from the group consisting of ethylenediamine tetracetic acid, glutamic acid diacetic acid, methylglycine diacetic acid, and combinations thereof.

15. The method according to claim 1, wherein the aqueous acid is present in an amount of about 1% to about 40% (w/w).

16. The method according to claim 15, wherein the aqueous acid is present in an amount of about 5% to about 20% (w/w).

17. The method according to claim 16, wherein the aqueous acid is present in an amount of about 15% (w/w).

18. The method according to claim 1, wherein
the sulfide is present as hydrogen sulfide downhole in an oilfield;
the composition comprises a compound of formula I, wherein each of $R^1$-$R^4$ is H;
the composition comprises the aqueous acid; and
the contacting occurs simultaneously with the exposure of the metal to the aqueous acid,
and before the metal is exposed to the aqueous sulfide.

* * * * *